US006403044B1

(12) United States Patent
Litz et al.

(10) Patent No.: US 6,403,044 B1
(45) Date of Patent: *Jun. 11, 2002

(54) METHOD AND APPARATUS FOR STABILIZING LIQUID ELEMENTAL MERCURY

(75) Inventors: John E. Litz, Lakewood; Thomas Broderick; Robin M. Stewart, both of Arvada, all of CO (US)

(73) Assignee: ADA Technologies, Inc., CO (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/258,659

(22) Filed: Feb. 26, 1999

Related U.S. Application Data

(60) Provisional application No. 60/076,119, filed on Feb. 27, 1998.

(51) Int. Cl.$^7$ .............................. C01G 13/00; A62D 3/00
(52) U.S. Cl. .................... 423/101; 423/566.1; 588/256; 210/914
(58) Field of Search .............................. 423/101, 566.1; 588/256; 210/751, 914

(56) References Cited

U.S. PATENT DOCUMENTS

| | | | |
|---|---|---|---|
| 2,860,952 A | 11/1958 | Bergeron et al. | 23/134 |
| 3,194,629 A | 7/1965 | Dreibelbis et al. | 23/2 |
| 3,232,033 A | 2/1966 | Williston et al. | 55/387 |
| 3,257,776 A | 6/1966 | Park et al. | 55/72 |
| 3,374,608 A | 3/1968 | Manes | 55/72 |
| 3,674,428 A | 7/1972 | Dean et al. | 23/134 |
| 3,749,761 A | 7/1973 | Dean et al. | 423/562 |

(List continued on next page.)

FOREIGN PATENT DOCUMENTS

| | | | |
|---|---|---|---|
| CA | 2173171 | * | 10/1996 |
| DE | 4123907 | * | 1/1993 |
| DE | 4422468 | * | 1/1996 |
| JP | 48-26672 | * | 4/1973 |
| JP | 51-69483 | * | 6/1976 |

OTHER PUBLICATIONS

Hartenstein, "A Fixed Bed Activated Coke/Carbon Filter as a final Gas Cleaning Stage Retrofitted for a Hazardous Waste Incineration Plant—The First 6 Months of Operating Experience", For Presentation at the 85$^{th}$ Annual Meeting & Exhibition Kansas City, Missouri, Jun. 21–26, 1992, pp. 2–16.

Huang et al., "Emissions of Airborne Toxics from coal–Fired Boilers: Mercury", Energy Systems division, Argonne National Laboratory, Sep. 1991, pp. 13–16.

Sittig, "Pollutant Removal Handbook", Noyes Data Corporation, 1973, pp. 286–294.

"Darco FGD Activated Carbon for Removal of Mercury and dioxin From Flue Gas", American Norit Company, pp. 1–5. No Date.

Blumbach and Nethe, "Sorbalit—A New Economic Approach Reducing Mercury and Dioxin Emissions", Air & Waste Management Association, Jun. 21–26, 1992, pp. 1–20.

Grant & Hackh's Chemical Dictionary, 5th edition, pp. 25,29, 1987.*

*Primary Examiner*—Steven Bos
(74) *Attorney, Agent, or Firm*—Sheridan Ross P.C.

(57) ABSTRACT

The present invention is directed to a system and method for converting hazardous speciated and elemental mercury-containing wastes to environmentally acceptable wastes by mixing the wastes in the presence of a polysulfide, water, and an mercury-reactive material, such as elemental sulfur.

44 Claims, 2 Drawing Sheets

U.S. PATENT DOCUMENTS

| | | | | |
|---|---|---|---|---|
| 3,790,370 A | | 2/1974 | Lalancette | 75/108 |
| 3,847,598 A | | 11/1974 | Coulter et al. | 75/121 |
| 3,857,704 A | | 12/1974 | Coulter | 75/121 |
| 3,873,581 A | * | 3/1975 | Fitzpatrick et al. | 423/101 |
| 4,053,401 A | | 10/1977 | Fukushima et al. | 210/52 |
| 4,094,777 A | | 6/1978 | Sugier et al. | 210/32 |
| 4,101,631 A | | 7/1978 | Ambrosini et al. | 423/210 |
| 4,147,626 A | * | 4/1979 | Findlay et al. | 210/52 |
| 4,230,486 A | | 10/1980 | Capuano et al. | 75/81 |
| 4,256,707 A | | 3/1981 | Flynn, Jr. et al. | 423/42 |
| 4,354,942 A | * | 10/1982 | Kaczur et al. | 588/23 |
| 4,419,107 A | | 12/1983 | Roydhouse | 55/5 |
| 4,474,896 A | * | 10/1984 | Chao | 502/216 |
| 4,599,177 A | | 7/1986 | Hayashi et al. | 210/718 |
| 4,709,118 A | | 11/1987 | Yan | 585/820 |
| 4,764,219 A | * | 8/1988 | Yan | 423/210 |
| 4,844,815 A | * | 7/1989 | Ader et al. | 210/751 |
| 4,861,493 A | | 8/1989 | Jansen | 210/715 |
| 4,892,567 A | | 1/1990 | Yan | 55/33 |
| 4,909,926 A | | 3/1990 | Yan | 208/253 |
| 4,915,818 A | * | 4/1990 | Yan | 208/251 R |
| 4,962,276 A | | 10/1990 | Yan | 585/867 |
| 4,986,898 A | | 1/1991 | Torihata et al. | 208/251 |
| 5,034,054 A | * | 7/1991 | Woodward | 423/566.1 |
| 5,053,209 A | | 10/1991 | Yan | 423/210 |
| 5,062,948 A | | 11/1991 | Kawazoe et al. | 208/251 |
| 5,080,799 A | | 1/1992 | Yan | 210/661 |
| 5,107,060 A | | 4/1992 | Yan | 585/823 |
| 5,141,724 A | | 8/1992 | Audeh et al. | 423/210 |
| 5,173,286 A | * | 12/1992 | Audeh | 423/99 |
| 5,192,163 A | | 3/1993 | Fleming | 405/128 |
| 5,202,301 A | | 4/1993 | McNamara | 502/417 |
| 5,322,628 A | | 6/1994 | Yan | 210/673 |
| 5,336,835 A | | 8/1994 | McNamara | 585/820 |
| 5,391,217 A | | 2/1995 | Zoche | 75/724 |
| 5,409,522 A | | 4/1995 | Durham et al. | 75/670 |
| 5,419,884 A | | 5/1995 | Weekman et al. | 423/210 |
| 5,463,167 A | | 10/1995 | Ou | 585/823 |
| 5,492,627 A | | 2/1996 | Hagen et al. | 210/651 |
| 5,523,067 A | | 6/1996 | Markovs | 423/99 |

* cited by examiner

METHOD AND APPARATUS FOR STABILIZING LIQUID ELEMENTAL MERCURY

CROSS-REFERENCE TO RELATED APPLICATIONS

The present application claims the benefits of U.S. Provisional Patent Application No. 60/076,119, filed on Feb. 27, 1998, which is incorporated herein by this reference in its entirety.

FIELD OF THE INVENTION

The present invention is directed generally to techniques for stabilizing mercury-containing materials and specifically to techniques for stabilizing elemental and speciated mercury in liquid and solid wastes.

BACKGROUND OF THE INVENTION

Because of the low melting point of elemental mercury and the toxicity of elemental mercury and environmentally unstable forms of speciated mercury to animals and humans, many environmental regulatory agencies, such as the U.S. Environmental Protection Agency, restrict the disposal of elemental mercury and unstable forms of speciated mercury. Unstable forms of speciated mercury include mercury oxide and water soluble mercury compounds such as mercuric chloride, methylated mercury, and organomercury compounds. While the disposal of such forms of mercury remains a problem, hazardous waste materials containing mercury are being generated daily by many sources, such as laboratories that use unstable forms of mercury in testing procedures, manufacturers that build products containing unstable forms of mercury, and scrap products containing unstable forms of mercury such as thermometers, vacuum tubes, x-ray tubes, thermostats, and the like. The U.S. Department of Energy alone has over 5,000 kilograms of radioactively contaminated, liquid elemental mercury awaiting disposal.

A common method for stabilizing mercury-containing compounds is amalgamation with an amalgamating agent, such as lead, copper, silver, zinc, magnesium, aluminum, and sulfur. Methods using amalgamation commonly (a) are unable to stabilize adequately unstable forms of mercury in the hazardous waste material, particularly liquid elemental mercury waste materials or waste materials containing both elemental and unstable forms of speciated mercury, to pass applicable environmental regulations, (b) use expensive additives, and/or (c) operate on only a small scale and are difficult to scale up economically to handle large quantities of mercury-containing wastes.

There is therefore a need for a process for stabilizing mercury that effectively stabilizes both elemental and speciated mercury such that the treated waste material complies with pertinent environmental regulations, uses relatively inexpensive additives, and/or operates economically both on small and large scales.

SUMMARY OF THE INVENTION

The method and apparatus of the present invention provide a simple, scalable, inexpensive methodology for converting hazardous forms of mercury in waste materials into environmentally stable and nonhazardous waste materials. In one embodiment, the method includes the steps of:

combining the mercury-containing feed material with a polysulfide and a reactive sulfur-containing compound other than the polysulfide to form a composite feed material; and mixing the composite feed material to react the reactive sulfur-containing compound with the elemental and/or environmentally unstable forms of speciated mercury to form mercuric sulfide. The process effectively stabilizes both elemental and environmentally unstable forms of speciated mercury such that the treated waste material complies with pertinent environmental regulations (i.e., can pass the Toxic Characterization Leach Procedure or TCLP, or contains preferably no more than about 1,000 ppm and more preferably no more than about 200 ppm elemental mercury and/or environmentally unstable forms of speciated mercury).

The feed material can include high or low concentrations of either environmentally unstable forms of speciated mercury such as mercury oxide and water soluble mercury compounds (e.g., mercuric chloride, methylated mercury and organomercury compounds), and/or elemental mercury. Typically, the feed material has a total content of elemental and unstable forms of speciated mercury broadly ranging from about 0.01 to about 100% by weight. The process can be highly effective in applications where the feed material contains small or large amounts of elemental mercury and little or no speciated mercury or small or large amounts of speciated mercury and little or no elemental mercury. For liquid elemental mercury in particular, the feed material typically contains at least about 50 wt % elemental mercury and commonly is radioactive.

Because many mercury contaminated wastes contain water, the reactive sulfur-containing compound is any sulfur-containing compound (other than a polysulfide) that reacts with mercury in aqueous solutions. More preferably, the compound is elemental sulfur, an inorganic sulfide, and/or mixtures thereof, and even more preferably elemental sulfur, an alkali metal hydrogen sulfide, a mercaptan, an alkali metal sulfide, or mixtures thereof, with elemental sulfur being even more preferred. Elemental sulfur is reactive with mercury and is readily available and inexpensive. The preferred molar ratio between the reactive sulfur-containing compound on the one hand and the elemental mercury and/or unstable forms of speciated mercury on the other ranges from about 1:1 to about 30,000:1 and more preferably from about 2:1 to about 100:1. The reactive sulfur-containing compound typically ranges from about 10 to about 50 wt % and more typically from about 20 to about 30 wt % of the composite feed material.

The reactive sulfur-containing compound is preferably added to the feed material in the form of a powder. The average particle size of the powder preferably ranges from about 10 to about 500 micrometers and more preferably from about 50 to about 100 micrometers.

The polysulfide acts as an activator of the reaction between the reactive sulfur-containing compound and the unstable forms of mercury and is preferably selected from the group consisting of calcium polysulfide, sodium polysulfide, and other alkaline earth polysulfides and mixtures thereof. Such forms of polysulfide are readily soluble/suspendable in water and are readily available and inexpensive. The composite feed material preferably includes from about 0.5 to about 20 wt % and more preferably from about 2 wt % to about 10 wt % of the polysulfide. The preferred molar ratio between the reactive sulfur-containing compound on the one hand and the polysulfide on the other ranges from about 3:1 to about 650:1 and more preferably from about 10:1 to about 150:1 and between the polysulfide on the one hand and the elemental mercury on the other and unstable forms of speciated mercury preferably range from about 2000:1 to about 0.01:1 and more preferably from about 100:1 to about 0.1:1.

The polysulfide is typically dissolved or suspended in a liquid carrier or solvent. The preferred liquid carriers/solvents is water. A particularly preferred solution comprises from about 5 to about 29 wt % polysulfide. The polysulfide additive includes preferably from about 70 to about 95% and more preferably from about 75 to about 95% by weight of the liquid carrier/solvent.

The composite feed material is typically in the form of a flowable liquid (e.g., a nonviscous liquid or a viscous liquid such as a paste or slurry) and has a pH preferably at least about pH 7 and more preferably from about pH 9 to about pH 12 to inhibit the release of $H_2S$ gas during the mixing step.

The duration of the mixing step is important to realize the substantially complete conversion of the elemental mercury and speciated mercury to mercuric sulfide. Preferably, the mixing step has a duration of at least about 30 minutes and more preferably from about 60 to about 120 minutes.

The mixing step is preferably performed by intrusive mixing techniques. The mixing step can be performed by any suitable mixing device capable of mixing a viscous material and expelling (or venting) any vaporized liquid, such as by blending, beating, grinding, and the like, with stirred vessels including a plurality of rotating mixing blades being more preferred. The mixer is preferably at least one of the following: a pug mill, a screw-type mixer, a planetary mixer, and a ribbon blender. In such mixers, the blades preferably rotate at least about 5 rpm and most preferably at from about 10 to about 200 rpm. The mixer can be designed to be continuous by providing the mixer with a sufficient length to provide the required residence time.

A liquid and/or bulking agent can be combined, alone or together, with the feed material, to control the temperature of the intermediate feed material during the mixing step. As will be appreciated, the reaction of elemental sulfur and other mercury-reactive materials with the mercury is spontaneous and highly exothermic at room temperature, and the rate of the reaction is temperature dependent. The release of thermal energy from the reaction can increase the operating temperature and therefore the reaction rate which in turn releases additional thermal energy and so on which can ultimately lead to an uncontrolled reaction.

The liquid is typically selected such that the boiling point of the liquid is at or near the desired maximum operating temperature of the system to assist in controlling the operating temperature. Preferably, the maximum desired operating temperature is about 120° C. or less and more desirably about 100° C. or less. The preferred liquid for temperature control is water. Preferably, sufficient water is contacted with the feed material to provide a total water content of the composite feed material ranging from about 5 to about 30 wt. %.

The bulking agent provides not only temperature control but also a sufficient volume for efficient mixing to take place. The bulking agent can be any microporous granulated material, such as soils, sand, cement, vermiculite, perlite, silica gel, clays, plant fibers (ground corn cobs, sawdust, etc.), zeolites, activated carbon, activated alumina, polyacrylamide, and mixtures thereof, with sand, activated carbon, and activated alumina being most preferred. Preferably, the composite feed material contains from about 0–50 wt % and more preferably from about 20 wt % to about 40 wt % of the granulated material. The volumetric ratio of the bulking agent added to the feed material preferably ranges from about 0:1 to about 10:1 and preferably from about 1:1 to about 4:1. The average particle size of the bulking agent is preferably no more than about 1/8th inch.

The order of addition of the various components is important. Preferably, the order of addition is as follows: (a) the reactive sulfur-containing compound is first added to mixer and allowed to coat the inner surfaces of the mixer; (b) the feed material is next added to the mixer and is mixed with the reactive sulfur-containing compound to form a first composite feed material; (c) the bulking agent is then added to and mixed with the first composite material to form a second composite feed material; and (d) finally the polysulfide is added to and mixed with the second composite feed material to form the composite feed material. Water may be added at any time during these steps to mitigate the formation of dust and to control temperature.

In a second embodiment of the present invention, a method for stabilizing elemental and/or speciated mercury in a feed material is provided that includes:

combining the mercury-containing feed material with a bulking agent, a polysulfide, and an mercury-reactive material to form a composite feed material; and intrusively mixing the composite feed material to react the mercury-reactive material with the elemental and/or speciated mercury to form a mercury-containing compound or amalgam.

As used herein, mercury-reactive material broadly refers to any element or compound that forms an environmentally stable compound with mercury. The mercury-reactive material can be any substance that forms an environmentally stable compound or amalgam with mercury such as an environmentally benign metal (i.e., lead, silver, gold, zinc, magnesium, copper, aluminum, and reactive sulfur-containing compound. By way of example, the more preferred mercury-reactive material, namely mercaptans, alkali metal sulfides, alkali metal hydrogen sulfides, elemental sulfur, and mixtures thereof (with elemental sulfur being even more preferred), form an environmentally stable compound, HgS, when reacted with elemental mercury. The mercury-reactive material can be added in the form of a solid (e.g., a powder) or a solution in which the mercury-reactive material is dissolved in a solvent. Preferably, for liquid elemental mercury as the feed material, the composite feed material includes at least about 10 wt % of the mercury-reactive material (based upon 100 wt % mercury in the feed material) and most preferably from about 20 to about 30 wt % of the mercury-reactive material (based upon 100 wt % mercury in the feed material). The mass ratio of the mercury-reactive material to the mercury in the intermediate feed material preferably ranges from about 0.3:1 to about 1000:1 and more preferably from about 0.5:1 to about 100:1.

The method and system have a number of benefits. The process can be performed using conventional mixing devices on a batch, semi-continuous or continuous basis. The process is therefore readily scalable using existing (conventional) equipment.

DETAILED DESCRIPTION

The method of the present invention provides an effective method for converting elemental mercury and speciated mercury into an environmentally stable compound or amalgam, such as HgS, utilizing mercury-reactive material. To accomplish a high extent of reaction between the mercury and the mercury-reactive material, the method utilizes novel mixing additives and any suitable stirred vessel, including those of conventional designs.

Figure 1:
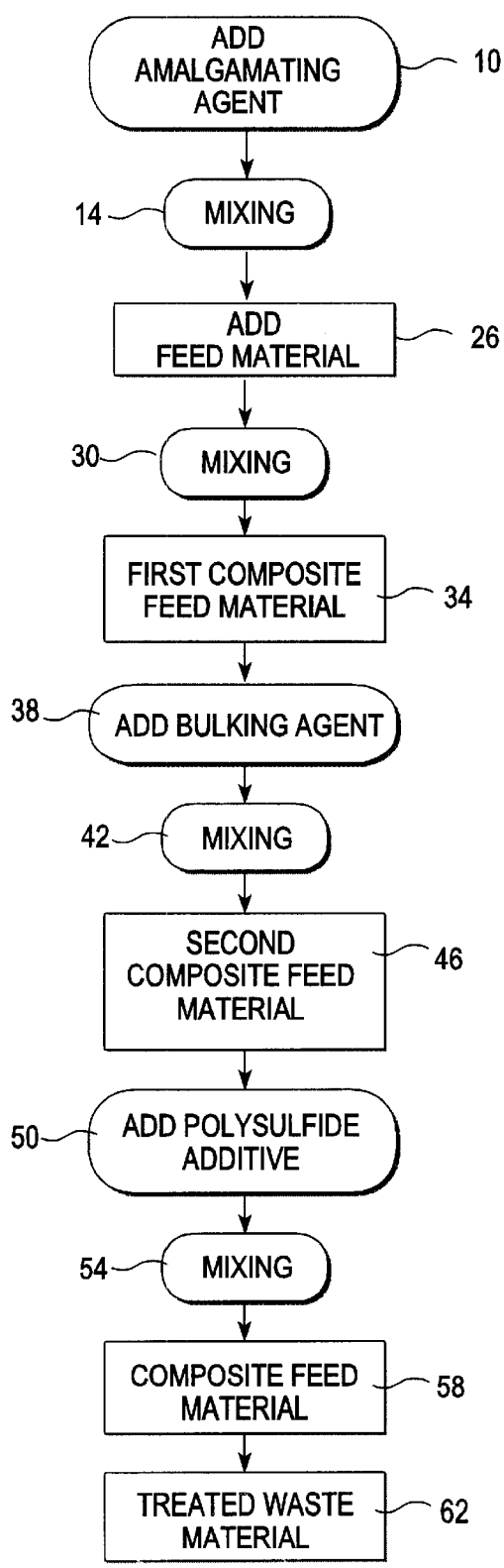
FIG. 1 is a flow schematic of a preferred mercury stabilization process of the present invention and FIG. 2 is a plan view of the pug mill.
Figure 2:
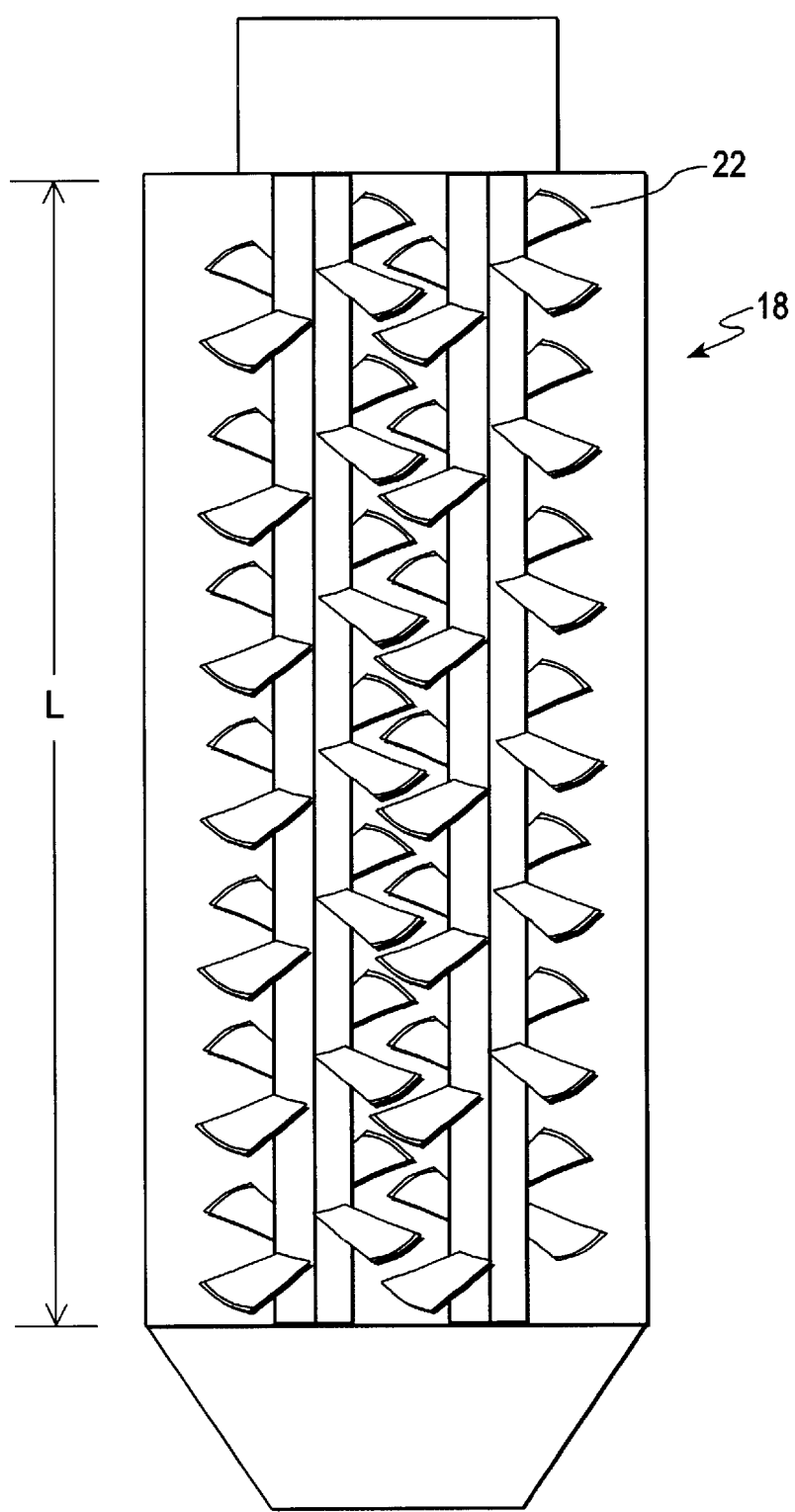

FIGS. 1 and 2 depict a preferred embodiment of the subject invention. The mercury-reactive material is added 10 to the mixer when the mixer when the mixer is in operation 14. The agent is allowed to coat the exposed surfaces of the mixer. The mixing device 18 has a plurality of rotating or counter-rotating blades 22 to provide a high degree of agitation of the feed material. A preferred mixing device 18 is a pug mill, such as a REITZ thermal screw, a HOLOFLITE dryer, and a BETHLEHEM PORCUPINE processor. The length "L" and volume of the mixing device is selected to provide the desired capacity and residence time of the mixing step.

Next, the elemental and/or speciated mercury-containing feed material 26 is placed into the mixer with the mercury-reactive material and subjected to mixing 30 to form a first composite feed material 34. The first composite feed material 34 is mixed 30 for a residence time typically ranging from about 5 to about 10 minutes before the addition of the bulking agent 38. For liquid elemental mercury wastes, the residence time is commonly sufficient for the liquid elemental mercury to no longer be visible. By permitting the mercury-reactive material to coat the exposed surfaces of the mixer before addition of the feed material, any mercury that coalesces or precipitates and thereby migrates to the bottom of the mixer contacts the mercury-reactive material and is stabilized. While not wishing to be bound by any theory, it is believed that a reason for inefficient amalgamation in prior art mercury stabilization processes is that the mercury coalesces and/or precipitates out of solution and migrates to the bottom of the mixer where it is hindered from reacting with the amalgamating agent.

After a sufficient period of time has passed, the first composite material 34 is mixed 42 with the bulking agent 38 to form the second composite feed material 46. The second composite feed material 46 is mixed 42 for a residence time typically ranging from about 10 to about 30 minutes, before the addition of the polysulfide additive 50.

After a sufficient period of time has passed, the second composite material 46 is mixed 54 with the polysulfide additive 50 to form the composite feed material 58. The composite feed material 58 is mixed for a residence time typically ranging from about 60 to about 120 minutes before discharge from the mixing device as a treated waste material 62. For liquid elemental mercury wastes, the residence time is typically sufficient for the composite feed material 58 to achieve a granular state.

Water may be added during any of the above-noted steps to mitigate formation of dust. Commonly, no more than about 30 wt. % water in the composite material is required to assist in control of dusting.

The mixing steps 14, 30, 42 and 54 can be performed in the same or different mixing vessels.

While not wishing to be bound by any theory, it is believed that the polysulfide additive (a) breaks down or disperses elemental mercury-containing particles in the intermediate feed material during mixing, thereby permitting the elemental and speciated mercury in the particles to form an amalgam with the mercury-reactive material, and (b) releases thermal energy (i.e., heat of reaction) upon reaction with the elemental and speciated mercury, thereby elevating the operating temperature of the system and increasing the reaction rate between the elemental and speciated mercury and mercury-reactive material. The elevated operating temperature causes enough of the elemental and speciated mercury to react with the mercury-reactive material to maintain the operating temperature at the desired levels for substantially complete reaction between the mercury-reactive material on the one hand and elemental and speciated mercury on the other to occur.

EXPERIMENT 1

To demonstrate the synergistic reaction among the bulking agent, the reactive sulfur-containing compound or mercury-reactive material, and the polysulfide, a series of experiments were run using liquid elemental mercury waste materials. The liquid elemental mercury wastes were added to a dual shaft mixer that accommodated 2 cubic feet of the waste material. The mixer was 3 feet in length and had a one square foot cross section. The mixer's blades were 5.5 inches long. A liner was placed in the mixer to reduce the dead volume below the blades. The mixer could process approximately 40 kilograms in an eight-hour shift with no difficulty.

In one example, 13.5 kg of the liquid elemental mercury waste material was mixed with 6.75 kg of elemental sulfur, 2.7 liters of calcium polysulfide, and four kg of sand. After the reaction was completed, there was only 600 ppm by weight free mercury remaining, and the waste passed TCLP testing (0.1 mg/L leachable mercury versus the statutory limit of 0.2 mg/L).

When the sand was omitted and the test conducted in the same manner as noted above, the free mercury content was 1,000 ppm by weight, and the leachable mercury content was 2 mg/L, which is well above the limit of 0.2 mg/L.

When the sand and calcium polysulfide were omitted and the test conducted in the same manner listed above, the elemental mercury coalesced and remained substantially unreacted.

Accordingly, the formulation of elemental sulfur, a liquid, a polysulfide, and a bulking agent such as sand enables the use of conventional mixing equipment to conduct the conversion of liquid elemental mercury into a disposable form.

EXPERIMENT 2

A test was performed to examine the direct treatment of elemental mercury in an aqueous/oily surrogate waste with calcium polysulfide. A similar waste may be encountered during the treatment of mercury-containing sludges.

In an Erlenmeyer flask, 20 ml of vegetable oil and 20 ml of water were added together with 0.34 grams of elemental mercury. The mixture was placed on a magnetic stir plate and mixed for 5 minutes to emulsify the oil and water. Next, 10 ml of calcium polysulfide was added to the flask. After mixing 3.5 hours, the mixture had turned black indicating that the mercury had reacted to form HgS. No beads of mercury were seen on the bottom of the flask.

These test results indicate that it is possible to directly treat elemental mercury with calcium polysulfide in the presence of oil and water.

EXPERIMENT 3

This test was performed to stabilize elemental mercury in a waste slurry matrix.

The slurry used for this test was a mixture of vegetable oil, water and soil. Combined in an Erlenmeyer flask was 10 ml of tap water, 10 ml of vegetable oil and 25 grams of soil. Approximately 0.75 grams of elemental mercury were added to the flask, along with 10 ml of calcium polysulfide. The contents of the flask were mixed for 4 hours.

The flask was then examined and was found to have a black coloration indicating the presence of HgS. However, it was not known whether all mercury had reacted. To determine if mercury was still present in the solids matrix, the contents of the flask were filtered using a buchner funnel and washed with 1,2 dichloroethane to remove any oil on the separated solids. Washing continued until the solvent ran clear. One interesting observation was the presence of iron filings on the magnetic stirrer taken from the mixing flask. Iron must have been presented in the soil added to the flask.

Next, the cake was placed in a clean Erlenmeyer flask with approximately 75 ml of bleach. This mixture was mixed for a period of 2 hours. The flask had a slight brownish color that again indicates that the oxidized mercury may be in the form of HgO. At this time, 10 ml of calcium polysulfide was added slowly to the flask. The mixture first turned a whitish color from the reaction of polysulfide continued, the mixture in the flask turned a black color due to the formation of HgS.

Mercury was present in the solids separated from the liquids. However, the presence of iron filings on the magnet indicate that there was not enough available sulfur to react with the mercury and iron. Iron should be reactive with the polysulfide to form FeS. The test required an excess of polysulfide due to the presence of the other reactive metals.

EXPERIMENT 4

This test demonstrates the stabilization of soluble mercuric chloride in an aqueous matrix.

The liquid used for this test was water containing mercuric chloride. Combined in an Erlenmeyer flask was 400 ml of tap water and 100 mg of mercuric chloride. Approximately 15 ml of calcium polysulfide was added to the flask. The contents of the flask were stirred briefly. The solution formed a black suspension that then settled out of solution. This black precipitate was presumably HgS.

The foregoing description of the present invention has been presented for purposes of illustration and description. Furthermore, the description is not intended to limit the invention to the form disclosed herein. Consequently, variations and modifications commensurate with the above teachings, in the skill or knowledge of the relevant art, are within the scope of the present invention. The embodiments described hereinabove are further intended to explain best modes known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art.

What is claimed is:

1. A method for stabilizing at least one of elemental and speciated mercury in a liquid feed material, the feed material containing at least about 50% by weight elemental mercury, comprising:

first combining in an intrusive mixer the mercury-containing liquid feed material with a mercury-reactive material other than a polysulfide to form a first composite feed material;

second combining the first composite feed material with a bulking agent to form a second composite feed material; and third combining the second composite feed material with a polysulfide to form a treated feed material.

2. The method of claim 1, wherein the feed material comprises speciated mercury selected from the group consisting of mercury oxide and water soluble forms of mercury, and mixtures thereof.

3. The method of claim 1, wherein the mercury-reactive material is selected from the group consisting of elemental sulfur, alkali metal sulfide, alkali metal hydrogen sulfide, mercaptans, and mixtures thereof.

4. The method of claim 1, wherein the stoichiometric ratio between the mercury-reactive material and the at least one of elemental and speciated mercury ranges from about 1:1 to about 30,000:1.

5. The method of claim 1, wherein the molar ratio between the mercury-reactive material and the polysulfide ranges from about 3:1 to about 650:1.

6. The method of claim 1, wherein the treated feed material is in the form of a liquid and the treated feed material has a pH ranging from about pH 7 to about pH 14.

7. The method of claim 1, wherein the treated feed material includes from about 5 to about 30 wt. % water.

8. The method of claim 1, wherein the combining steps a each performed by intrusive mixing techniques.

9. The method of claim 1, wherein in the second combining step the first composite feed material is combined with at least about 20% by volume of the bulking agent.

10. The method of claim 1, wherein the first combining step further includes the steps of first mixing the mercury-reactive material in the intrusive mixer that is at least substantially free of the feed material and second mixing the feed material with the mercury-reactive material in the intrusive mixer.

11. The method of claim 1, wherein the polysulfide is in a compound with an alkaline earth metal and is contained in a liquid carrier or solvent.

12. The method of claim 11, wherein the polysulfide is in an aqueous solution that includes from about 5 to about 29 wt % of the polysulfide.

13. The method of claim 8, wherein the mixing is performed by at least one of the following: a pug mill, a screw-type mixer, a planetary mixer, and a ribbon blender.

14. The method of claim 1, wherein the mercury-reactive material is in the form of a powder and the average particle size of the powder ranges from about 10 to about 500 micrometers.

15. The method of claim 1, wherein the molar ratio between the polysulfide and the at least one of elemental and speciated mercury ranges from about 2000:1 to about 0.01:1.

16. A method for stabilizing liquid elemental mercury in a liquid feed material, the feed material containing at least about 50 percent by weight of the elemental mercury comprising:

(a) mixing a liquid containing a mercury-reactive material in an intrusive mixer to at least partially coat the interior surfaces of the intrusive mixer with the mercury-reactive material;

(b) thereafter contacting the mercury-reactive material with the liquid feed material in the intrusive mixer to form a composite feed material; and (c) thereafter mixing the composite feed material for a time period sufficient to form a treated feed material.

17. The method of claim 16, further comprising before step (c) and after step (b), contacting the composite feed material with at least one of a bulking agent or a liquid to form a first composite feed material, and thereafter contacting the first composite material with a polysulfide to form a second composite feed material.

18. The method of claim 17, wherein the concentration of the polysulfide in the second composite feed material ranges from about 0.5 to about 20% by weight.

19. The method of claim 16, wherein the mercury-reactive material is at least one of elemental sulfur and an inorganic sulfide and wherein the concentration of the at least one of elemental sulfur and an inorganic sulfide in the composite feed material ranges from about 10 to about 50% by weight.

20. The method of claim 16, further comprising adding from about 5 to about 30% by weight water to the composite feed material.

21. The method of claim 17, wherein the polysulfide is one or more alkaline earth metal polysulfides.

22. A method for stabilizing liquid elemental mercury in a feed material containing at least about 50 percent by weight of the liquid elemental mercury, comprising:
   combining the mercury-containing feed material with a reactive sulfur-containing compound in an intrusive mixer to form a first composite feed material;
   thereafter combining a polysulfide with the first composite feed material to form a second composite feed material; and
   intrusively mixing the second composite feed material to react the reactive sulfur-containing compound with the liquid elemental mercury to form an at least substantially stable mercury-containing material.

23. The method of claim 22, further comprising after the combining step and before the thereafter combining step the step of combining the first composite feed material with a bulking agent and wherein the first composite feed material includes from about 20 to about 40 wt. % of the bulking agent.

24. The method of claim 23, wherein the bulking agent is selected from the group consisting of sand, zeolites, activated carbon, activated alumina, soil, cement, vermiculite, perlite, polyacrylamide, silica gel, clays, plant fibers, and mixtures thereof.

25. The method of claim 24, wherein the reactive sulfur-containing compound is selected from the group consisting of elemental sulfur, alkali metal sulfide, alkali metal hydrogen sulfide, mercaptans, and mixtures thereof.

26. The method of claim 22, wherein the amount of the reactive sulfur-containing compound added to the feed material is at least about 100% of the stoichiometric ratio relative to the total amount of the liquid elemental mercury in the feed material.

27. The method of claim 16, wherein the duration of the thereafter mixing step ranges from about 60 to about 120 minutes.

28. A process for stabilizing liquid elemental mercury, comprising:
   (a) first mixing a reactive sulfur-containing compound in an intrusive mixer;
   (b) second adding the liquid elemental mercury to the reactive sulfur-containing compound in the intrusive mixer;
   (c) third mixing, in the intrusive mixer, the liquid elemental mercury with the reactive sulfur-containing compound to form a first mixture;
   (d) fourth contacting the first mixture with a bulking agent;
   (e) fifth mixing, in the intrusive mixer, the first mixture and the bulking agent to form a second mixture;
   (f) sixth contacting the second mixture with a polysulfide; and
   (g) seventh mixing, in the intrusive mixer, the second mixture with the polysulfide to form a third mixture in which at least most of the liquid elemental mercury is in the form of mercuric sulfide.

29. The process of claim 28, wherein the reactive sulfur-containing compound is selected from the group consisting of elemental sulfur, alkali metal sulfide, alkali metal hydrogen sulfide, mercaptans, and mixtures thereof.

30. The process of claim 28, wherein in the first mixing step (a) the intrusive mixer is at least substantially free of the liquid elemental mercury.

31. The process of claim 28, wherein in the second adding step (b) the liquid elemental mercury is in a liquid feed material containing at least about 50 percent by weight of the liquid elemental mercury.

32. The process of claim 28, wherein the bulking agent is selected from the group consisting of sand, zeolites, activated carbon, activated alumina, soil, cement, vermiculite, perlite, polyacrylamide, silica gel, clays, plant fibers, and mixtures thereof.

33. The process of claim 28, wherein in step (d) the first mixture is also contacted with a liquid to control the temperature of the second mixture.

34. The method of claim 1, wherein the first combining step the mercury-reactive material comprises a liquid and the mercury-reactive material is allowed to at least partially coat the interior of the intrusive mixer before the liquid feed material is introduced in to the intrusive mixer.

35. The method of claim 16, wherein the liquid in step (a) is a solvent and mercury-reactive material is dissolved in the solvent.

36. The method claim 22, wherein in the combining step the reactive sulfur-containing compound comprises a liquid and is introduced into the intrusive mixer before the mercury-containing feed material and allowed to at least partially coat the interior of the intrusive mixer.

37. The method of claim 28, wherein the reactive sulfur-containing compound is in the form of a liquid.

38. The method of claim 22, wherein the molar ratio between the polysulfide and the elemental mercury in the feed material ranges from about 2000:1 to about 0.01:1.

39. The method of claim 22, further comprising:
   mixing the mercury-containing feed material and the reactive sulfur-containing compound in the intrusive mixer prior to the thereafter combining step.

40. The method of claim 22, wherein the concentration of the polysulfide in the second material ranges from about 0.5 to about 20% by weight.

41. The method of claim 22, further comprising adding from about 5 to about 30% by weight water to the first material.

42. The method of claim 22, wherein the polysulfide is one or more alkaline earth metal polysulfides.

43. A method for stabilizing liquid elemental mercury in a liquid feed material, the feed material containing at least about 50 percent by weight of the elemental mercury, comprising:
   (a) mixing a mercury-reactive material in an intrusive mixer to at least partially coat the interior surfaces of the intrusive mixer with the mercury-reactive material;
   (b) thereafter contacting the mercury-reactive material with the liquid feed material in the intrusive mixer to form a first material;
   (c) contacting the first material with at least one of a bulking agent or a liquid to form a second material; and
   (d) thereafter contacting the second material with a polysulfide to form a treated material.

44. A method for stabilizing liquid elemental mercury in a liquid feed material, the feed material containing at least about 50 percent by weight of the elemental mercury, comprising:

(a) mixing mercury-reactive material in an intrusive mixer to at least partially coat the interior surfaces of the intrusive mixer with the mercury-reactive material;

(b) thereafter contacting the mercury-reactive material with the liquid feed material in the intrusive mixer to form a first material;

(c) adding from about 5 to about 30% by weight water to the first material; and (d) thereafter mixing the first material for a time period sufficient to form a treated materail.

* * * * *